Figure 1:
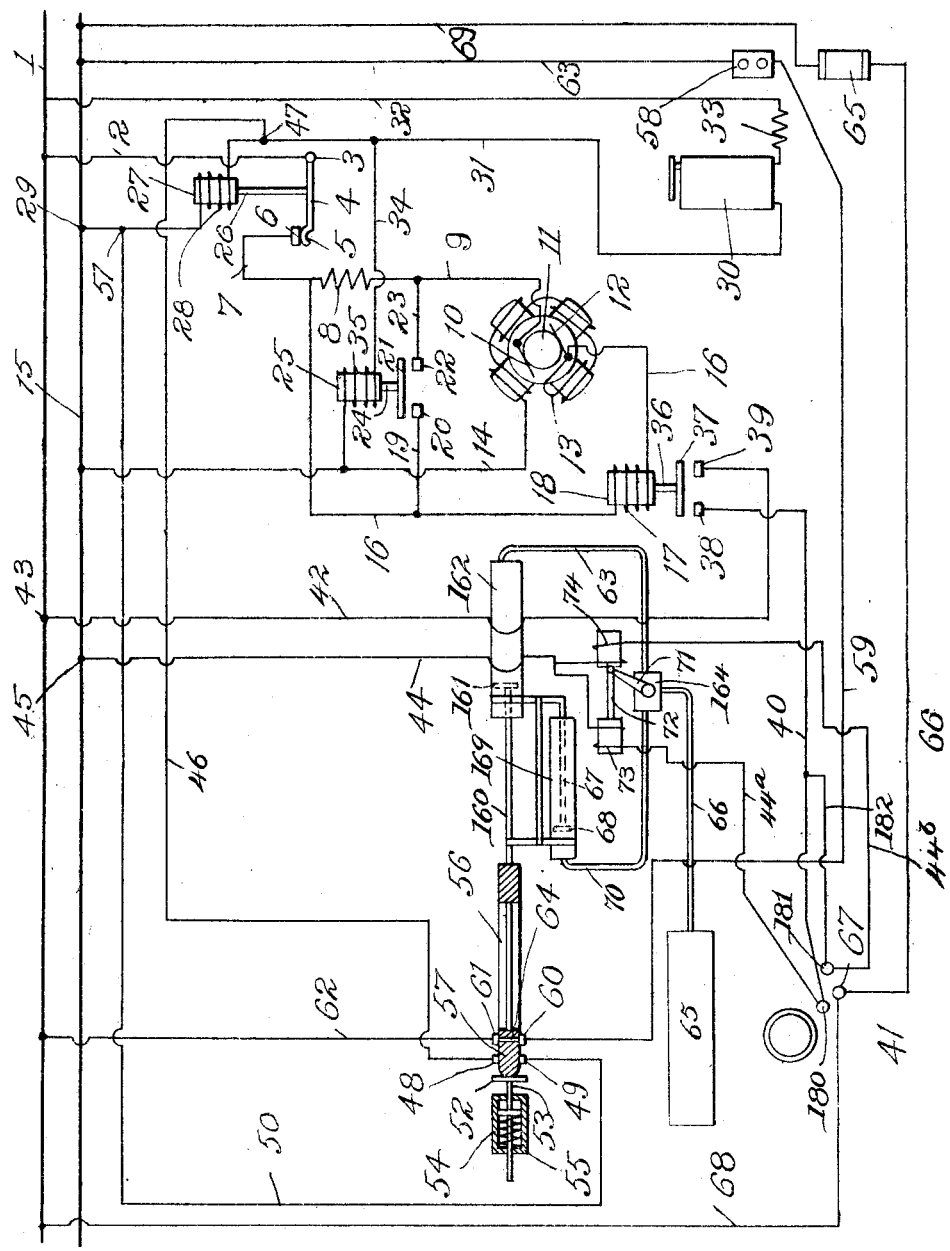

W. S. MENDEN.
MOTOR CONTROL DEVICE.
APPLICATION FILED APR. 30, 1913.

1,138,497.

Patented May 4, 1915.
3 SHEETS—SHEET 1.

Witnesses:
Elsie Swenson
Ray J. Ernst

Inventor
William S. Menden
By his Attorneys

W. S. MENDEN.
MOTOR CONTROL DEVICE.
APPLICATION FILED APR. 30, 1913.

1,138,497.

Patented May 4, 1915.
3 SHEETS—SHEET 2.

Witnesses:
Elsie Swenson
Ray T. Ernst

Inventor
William S. Menden
By his Attorneys

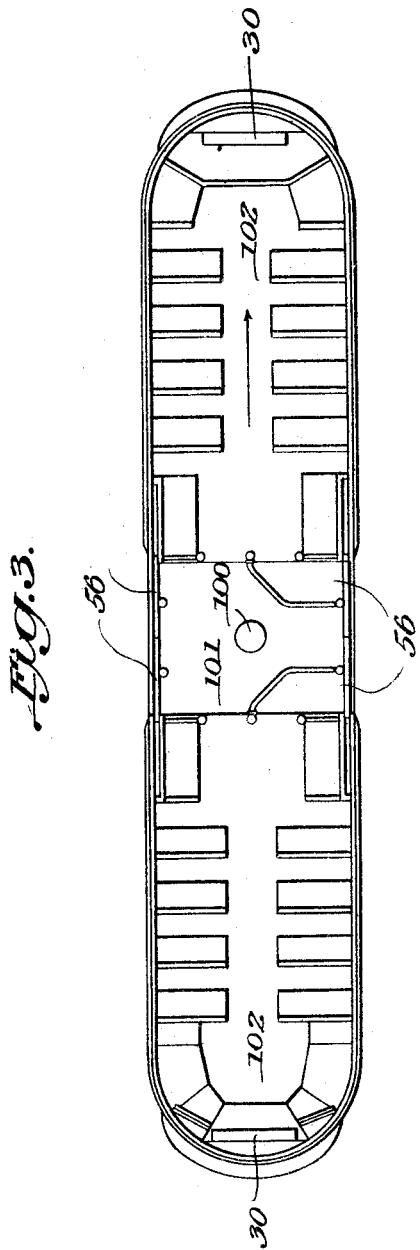

UNITED STATES PATENT OFFICE.

WILLIAM S. MENDEN, OF BROOKLYN, NEW YORK, ASSIGNOR TO MEGOSIN COMPANY, INC., A CORPORATION OF NEW YORK.

MOTOR-CONTROL DEVICE.

1,138,497.  Specification of Letters Patent.  Patented May 4, 1915.

Original application filed January 2, 1913, Serial No. 739,755. Divided and this application filed April 30, 1913. Serial No. 764,588.

*To all whom it may concern:*

Be it known that I, WILLIAM S. MENDEN, a citizen of the United States, residing in the borough of Brooklyn, county of Kings, and State of New York, have invented certain new and useful Improvements in Motor-Control Devices, of which the following is a full and clear specification.

This invention relates to motor-control devices for rapid transit cars, especially that type of cars with which the subject matter of my co-pending application Serial No. 739,755, filed January 2, 1913, is concerned and of which application, the present invention forms a divisional portion thereof.

The primary object of the present invention is to provide an improved controlling mechanism whereby in cases of emergency, the motor can be short-circuited and the brakes applied automatically by an individual positioned at a distance from the motorman, said individual preferably being the conductor who may be located on a centrally disposed platform such as shown and described in the above-mentioned application Serial No. 739,755. A device of this character, such as shown and described in the drawings and specification, is peculiarly serviceable in connection with cars used for rapid transit in congested districts.

Other and further objects will be apparent in the specification and be pointed out in the appended claims, reference being had to the accompanying drawings exemplifying the invention and in which,—

Figure 2:
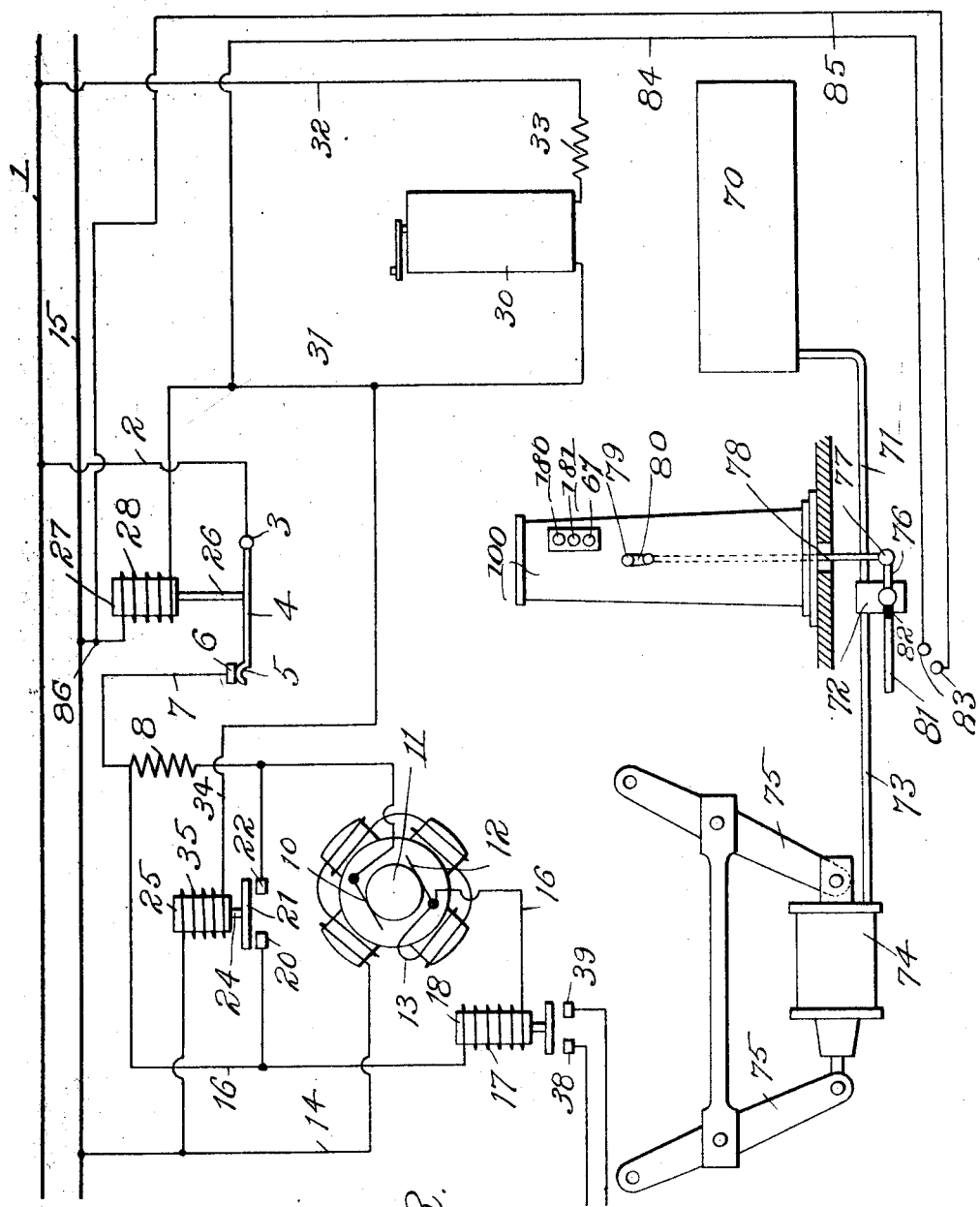

Figure 1 is a general wiring diagram of the car showing the controlling connections for the motor, Fig. 2 is a similar wiring diagram on an enlarged scale, embodying portions of the circuits shown in Fig. 1 and illustrating an emergency control of the brakes together with the motor control. Fig. 3 is a plan view of the floor of the car showing center entrance platform and arrangement of pedestal thereon for mounting the control instrumentalities.

Referring more particularly to the drawings and to the embodiment of my invention shown therein, the positive line 1 of the electric circuit is connected by a branch 2 with the pivot 3 of a switch lever 4, the outer end 5 of said lever being adapted to contact with a contact plate 6 at the end of a lead wire 7 which is connected up with one end of a resistance coil 8, the other end of said coil being connected by a wire 9 with the positive brush 10 which runs on the armature 11 of the motor. The negative brush 12 of said motor is connected to the field winding 13 of the motor, said field winding being connected also to a line wire 14 which is grounded in the negative line 15, which is commonly the rail of the track. Also connected to the brush 12, is a branch line 16 which embodies a coil 17 around a core 18, the other end of said branch 16 being connected to the line 7 adjacent the point at which said line 7 is connected to the coil 8. In order to provide a shunt between the wires 9 and 16, for the purpose to be hereinafter explained, a pair of shunt wires 19 and 23 with terminal contacts 20 and 22 are provided in such a way as to form a gap which may be closed by an armature 21 under certain conditions met with in the operation of my device. The armature 21 is provided with a stem 24 which connects it to the plunger 25 of a solenoid to be hereinafter referred to. A plurality of switch levers 4 (only one of which is shown) which are pivoted at 3, are suitably arranged and each provided with a stem 26 which is connected to a plunger 27 of a solenoid 28, said solenoid being grounded at 29 in the negative line 15. Said solenoid 28 is one of a series (only one being shown so as to avoid confusion) which are adapted to successively operate the switches for throwing stepped resistances 8 (of which only one is shown) into circuit with the armature of the motor. Suitable contact (not shown) within the controller box 30, are connected to each of the solenoids 28 by means of a line wire 31. A branch line 32 connects the positive line 1 with the controller box 30 through a resistance coil 33. From this description, it will be seen that when the circuit is broken within the controller box 30, the solenoid 28 is deënergized and the armature 4 drops thus breaking the circuit through the particular resistance 8 and the motor. A branch line 34 which leads from the line 31 to the solenoid 35 which surrounds the plunger 25, is connected at its other end to the line 14 leading from the field of the motor to the ground line 15. Normally, therefore, the armature 21 is held in raised position when there is a current traversing any coil of the resistance controller box 30. Reciprocable within the solenoid 17, is the plunger 18 which carries the stem 36 of an armature 37 which is adapted to bridge the gap between the contacts 38—39 which are respectively connected to a wire 40 which terminates in a circuit closing device 41 and another line 42 which is connected at 43 with the positive line 1. The circuit closing device 41 is grounded through a wire 44 which connects at 45 to the ground wire 15.

In order to provide suitable and efficient means for rendering the motor positively inoperative at such times as the door of the car may be opened for the ingress and egress of passengers, a branch wire 46 is connected at one end 47 to the wire 31 and has its other end terminating in a contact 48. A contact 49 which is spaced from the contact 48 is connected by a wire 50 which is connected at 51 to the wire leading from the solenoid 28 and grounded at 29 in the ground wire 15. An armature 52 having a stem 53 is under a normal tendency to be moved into position bridging the contacts 48 and 49. For this purpose, a spring 54 is mounted within a housing 55 in a suitable manner to effect a pressure upon the stem 53 and armature 52. The door 56 or, to be more exact, a stile 57 of said door, is adapted to abut against the armature 52 when said door is in closed position, thereby serving to break the circuit which short-circuits the controller box 30 in the manner to be hereinafter pointed out. In order that the motorman may be notified when the door is open, any suitable signal 58 (preferably a visible one), is connected by a wire 59 with a contact 60, said contact being spaced from another contact 61 which is connected by a wire 62 with the positive line 1. The signal 58 is connected by a wire 63 to the ground line 15. Mounted in the stile 57 of the door, is a short conductor 64 which is adapted when the door is in closed position to bridge the gap between the contacts 60 and 61, so that when the signal 58 is energized, the motorman knows that the door is closed. Means permitting the conductor to signal the motorman are provided by a signal 65 which is connected by a wire 66 to a push button 67, said push button being also connected by a wire 68 to the positive line wire 1. The signal 65 is connected by wire 69 to the ground line 15. The door 56 may be moved by any suitable mechanism such as that shown and described in my co-pending application Serial No. 764,589, or said door may be opened and closed by hand. Referring now to Fig. 2 of the drawings, it is desirable to have some emergency control device whereby the conductor can secure absolute control of the car. For this purpose I preferably employ an emergency braking apparatus adapted to be operated by the conductor and in conjunction therewith, means for short-circuiting the motor controlling circuits whereby the motorman ordinarily operates the car. According to the preferred embodiment of this device shown in Fig. 2, a reservoir 70 for compressed air or the like is connected by a pipe 71 to a valve 72, which valve is connected by a pipe 73 with the pressure cylinder 74, which in a well-known manner is adapted to impart the braking movements to the levers 75. The valve 72 is controlled by a crank arm 76 which is pivotally connected at 77 to the lower end of a connecting rod 78 which is connected at its upper end to a crank (not shown) which depends from a shaft 79, said shaft being in turn provided with a handle 80 which can be grasped by the conductor. Connected with the lever arm 76 is a suitable bar conductor 81 which is insulated from the lever arm 76 by any suitable insulation 82. The bar 81 is adapted to bridge the gap between a pair of spaced contacts 83, one of said contacts forming the terminal of a wire 84 which leads from the wire 31, and the other of said contacts forming the terminal of a wire 85 which connects at 86 to the wire leading from the solenoid 28 and which is grounded in the negative line wire 15.

The several controlling instrumentalities are mounted on a pedestal 100 which is centrally disposed on a center entrance platform 101 as shown in Fig. 3. Platform 101 is preferably constructed and arranged according to the description contained in my hereinbefore mentioned application, Ser. No. 739,755 and is disposed midway of the ends of the car, said ends being provided with platforms 102 upon which the controllers 30 are mounted. An inspection of Fig. 2 will show the general arrangement on the pedestal 100 of the push buttons 180, 181 and 67 which have been referred to in connection with the circuits traced on Fig. 1. Referring again to Fig. 1, the door 56 has connected thereto, a piston rod 160 which carries a piston 161 reciprocable in the cylinder 162. A compressed air pipe 163 is adapted to convey air to said cylinder 162, a valve arm 171 being operated by a plunger 172 which is subject to the alternate energization of coils 173 and 174, the circuits through which are controlled by push buttons 180 and 181 respectively. The passage of air through a valve chamber 164 is thus controlled, the said valve chamber being connected by a pipe 166 to a reservoir 165. Leading from the valve chamber 164 is a second pipe 170 which connects with the cylinder 169. Rigidly connected to the piston rod 160 is a second piston rod 167 which carries a piston 168 which reciprocates in the cylinder 169.

The operation of my improved device will now be readily understood and briefly described is as follows: When the motorman operates the controller to start the car, a circuit is closed from line wire 1 through wire 32, resistance 33, contacts in controller box 30, line 31, solenoid 28 and ground line 15, this energizes the solenoid 28 and raises the plunger 27 together with switch lever 4 and moves said switch lever to the contact 6. This closes a circuit from line 1 through wire 2, switch 4, wire 7, resistance 8, wire 9, armature 11, field wire 13 and wire 14 which is grounded in line 15. At the same time, a branch circuit is closed which includes wire 16, field winding 13 and ground wire 14, the result being that the plunger 18 together with the armature 37 is raised to break a circuit including wire 42, contacts 38 and 39, armature 37, wire 40, push button 180 or 181, wire 44ᵃ or 44ᵇ, and wire 44, this circuit being suitable to control the energization of coil 173 or coil 174 and the oscillatory movements of the valve arm 171 for operating the valve in housing 164. Said valve is thus adapted to admit pressure fluid to cylinders 162 and 169 for closing and opening the door 56. In order to maintain the energization of the solenoid 17 when the current is shut off from the motor and so as to maintain the door operating mechanism inoperative when the current is cut off from the armature 11 and while the car is yet in motion, as pointed out in said application, a lesser circuit including line 9, armature 11, solenoid 17, branches 19 and 23 with armature 21 for closing the gap therebetween, is provided. Suitable means for maintaining this lesser circuit inoperative while power is being applied to the motor, is provided in the following circuit, namely, wire 34, solenoid 35 and that portion of wire 14 which is grounded in the line 15, this branch circuit serving to maintain the armature 21 in elevated position. When the car comes to rest and the door 56 is opened, the armature 52 comes into contact with contacts 48 and 49 and closes a circuit including wire 32, contacts in controller box 30, wire 31, wire 46 which branches at 47 from the wire 31, armature 52, wire 50 which joins the ground wire from the solenoid 28 at 51 thus serving to short-circuit the solenoid 28 and rendering it impossible to energize the motor.

What I claim is:

1. In a passenger car, a motor, a circuit therefor, a shunt for short circuiting said motor, and a make and break device for said shunt.

2. In a passenger car, a motor, a circuit therefor, a short-circuiting shunt for said motor, a make and break device for said shunt circuit, and a door adapted to operate said make and break device.

3. In a passenger car, an electric motor, a circuit for operating said motor, said circuit including a switch, means for operating said switch, a shunt circuit for controlling said operating means, a short circuiting branch for said shunt, a switch for said branch, and a door for said car operatively connected to the switch for said branch, said branch switch being normally held in open position by the door in closed position and adapted to automatically close said branch when the door is opened.

4. In a passenger car, an electric motor, an operating circuit therefor, a switch included in said circuit, a shunt circuit including means for operating said switch, a door for said car, and means operatively related to said door for short circuiting said shunt circuit.

5. In a passenger car, a motor, a circuit including said motor, a door for said car, and means operated by said door for short circuiting said motor.

6. In a passenger car, a door, door operating means, a motor, means operated by the door for rendering the motor inoperative at one time, and means controlled by the motor for rendering the door operating means inoperative at another time.

7. In a passenger car, an electric motor, a switch for controlling the operation of said motor, means for operating said switch, a circuit for controlling said operating means, a short circuiting shunt for said circuit, a switch for said shunt, and a door for said car operatively connected to the switch for said shunt.

8. In a passenger car, a motor, a controller therefor, a door, automatic means under the control of said motor for opening and closing said door, and a signal adjacent said controller operatively controlled by said door.

9. In a passenger car, the combination with a motor, of an automatic door, a circuit controlling said door, said circuit being provided with a make and break device, a motor circuit including said device and normally holding it in circuit breaking position, a short circuiting shunt for said motor circuit, said shunt having a gap and an armature adapted to close said gap, and means depending upon the energization of the motor circuit for retaining said armature in open position, said armature being adapted to close the shunt automatically when the motor is deënergized.

10. In a passenger car, a motor, an operating circuit therefor, an automatic door, an operating circuit for said door, means for breaking the door-operating circuit, said means being energized by the motor circuit, a shunt for short circuiting the motor when it operates as a generator, and means normally maintaining a break in said shunt during the energization of the motor circuit.

11. In a passenger car provided with end platforms for the motorman and an intermediate platform for the entrance and exit of passengers, a revoluble turret on said intermediate platform circuits terminating in said turret for controlling the opening and closing of said doors, signals on said end platforms and circuits also terminating in said turret for operating said signals.

12. In a passenger car provided with end platforms for the motorman and an intermediate platform for the entrance and exit of passengers, a motor, motor controllers on said end platforms, circuits including said motors and controllers, doors for said intermediate platform, circuits for controlling the opening and closing of said doors, and means mounted on said intermediate platform coöperatively controlling said circuits.

13. In a passenger car provided with an intermediate platform for the entrance and exit of passengers, a motor, a motor controller, a circuit including said motor and controller and means on said intermediate platform for controlling said circuit independently of said controller, said means including a door for said intermediate platform and a circuit making and breaking device operated by said door.

14. In a passenger car provided with an intermediate platform for the entrance and exit of passengers, a motor, a motor controller, a circuit including said motor and controller, doors for said intermediate platform, circuits for controlling the opening and closing of said doors, and means mounted on said intermediate platform coöperatively controlling said circuits.

WILLIAM S. MENDEN.

Witnesses:
WM. A. COURTLAND,
V. J. CHARTRAND.